(12) United States Patent
Sweeney et al.

(10) Patent No.: US 7,985,526 B2
(45) Date of Patent: Jul. 26, 2011

(54) SUPERCRITICAL FLUID MICROENCAPSULATION OF DYE INTO LATEX FOR IMPROVED EMULSION AGGREGATION TONER

(75) Inventors: Maura A. Sweeney, Irondequoit, NY (US); Grazyna Kmiecik-Lawrynowicz, Fairport, NY (US); Robert D. Bayley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 39 days.

(21) Appl. No.: 12/546,847

(22) Filed: Aug. 25, 2009

(65) Prior Publication Data

US 2011/0053076 A1    Mar. 3, 2011

(51) Int. Cl.
G03G 9/087    (2006.01)
(52) U.S. Cl. ............ 430/137.15; 430/137.1; 430/137.16
(58) Field of Classification Search ............... 430/137.1, 430/137.15, 137.16
See application file for complete search history.

(56) References Cited

U.S. PATENT DOCUMENTS

| | | |
|---|---|---|
| 3,590,000 A | 6/1971 | Palermiti et al. |
| 3,933,954 A | 1/1976 | Gebhard, Jr. et al. |
| 4,056,653 A | 11/1977 | Gebhard, Jr. et al. |
| 4,298,672 A | 11/1981 | Lu |
| 4,338,390 A | 7/1982 | Lu |
| 4,482,731 A | 11/1984 | Fuchs et al. |
| 4,613,559 A | 9/1986 | Ober et al. |
| 5,227,460 A | 7/1993 | Mahabadi et al. |
| 5,278,020 A | 1/1994 | Grushkin et al. |
| 5,290,654 A | 3/1994 | Sacripante et al. |
| 5,302,486 A | 4/1994 | Patel et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,354,804 A | 10/1994 | Inada et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,399,597 A | 3/1995 | Mandel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,548,004 A | 8/1996 | Mandel et al. |
| 5,585,215 A | 12/1996 | Ong et al. |
| 5,650,255 A | 7/1997 | Ng et al. |
| 5,650,256 A | 7/1997 | Veregin |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,637 A | 6/1998 | Shine et al. |
| 5,766,818 A | 6/1998 | Smith et al. |
| 5,804,349 A | 9/1998 | Ong et al. |
| 5,827,633 A | 10/1998 | Ong et al. |
| 5,840,462 A | 11/1998 | Foucher et al. |
| 5,853,943 A | 12/1998 | Cheng et al. |
| 5,853,944 A | 12/1998 | Foucher et al. |
| 5,863,698 A | 1/1999 | Patel et al. |
| 5,869,215 A | 2/1999 | Ong et al. |
| 5,902,710 A | 5/1999 | Ong et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 5,994,020 A | 11/1999 | Patel et al. |
| 6,063,827 A | 5/2000 | Sacripante et al. |
| 6,080,807 A | 6/2000 | Campbell |
| 6,120,967 A | 9/2000 | Hopper et al. |
| 6,214,507 B1 | 4/2001 | Sokol et al. |
| 6,512,024 B1 | 1/2003 | Lundgard et al. |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 7,064,156 B2 | 6/2006 | Rink et al. |
| 7,385,001 B2 | 6/2008 | Shim et al. |
| 2001/0036586 A1 * | 11/2001 | Adachi et al. .............. 430/110.1 |
| 2002/0074681 A1 | 6/2002 | Lundgard et al. |
| 2005/0277045 A1 * | 12/2005 | Saito et al. .................. 430/109.3 |
| 2006/0222991 A1 | 10/2006 | Sacripante et al. |
| 2007/0020548 A1 * | 1/2007 | Tanaka et al. .............. 430/109.1 |
| 2008/0107989 A1 | 5/2008 | Sacripante et al. |
| 2008/0153027 A1 | 6/2008 | Veregin et al. |

FOREIGN PATENT DOCUMENTS

| | | |
|---|---|---|
| WO | WO 98/45356 A1 | 10/1998 |
| WO | WO 00/17256 A1 | 3/2000 |

\* cited by examiner

*Primary Examiner* — Hoa V Le

(57) ABSTRACT

The present disclosure provides methods for incorporating a dye into latex particles via a supercritical fluid microencapsulation technique, in order to achieve improved dispersion of a colorant in the latex and an increase in color gamut.

14 Claims, No Drawings

SUPERCRITICAL FLUID MICROENCAPSULATION OF DYE INTO LATEX FOR IMPROVED EMULSION AGGREGATION TONER

BACKGROUND

The present disclosure relates to emulsion aggregation toners and processes useful in providing color toners suitable for electrostatographic apparatuses, including xerographic apparatuses such as digital, image-on-image, and similar apparatuses.

Numerous processes are within the purview of those skilled in the art for the preparation of toners. Emulsion aggregation (EA) is one such method. These toners are within the purview of those skilled in the art and toners may be formed by aggregating a colorant with a latex polymer formed by emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,403,693, 5,418,108, 5,364,729, and 5,346,797, the disclosures of each of which are hereby incorporated by reference in their entirety. Other processes are disclosed in U.S. Pat. Nos. 5,527,658, 5,585,215, 5,650, 255, 5,650,256 and 5,501,935, the disclosures of each of which are hereby incorporated by reference in their entirety.

One type of emulsion aggregation toner includes a styrene acrylate resin as illustrated in, for example, U.S. Pat. No. 6,120,967, the disclosure of which is hereby incorporated by reference in its entirety.

Emulsion aggregation techniques involve the formation of an emulsion latex of the resin particles, which particles have a small size of, for example, from about 5 to about 500 nanometers in diameter, by heating the resin, optionally with solvent if needed, in water, or by making a latex in water using emulsion polymerization. A colorant dispersion, for example a pigment dispersed in water, optionally also with additional resin, may be separately formed. The colorant dispersion is added to the emulsion latex mixture, and an aggregating agent or complexing agent is then added to form aggregated toner particles. The aggregated toner particles are optionally heated to enable coalescence/fusing, thereby achieving aggregated, fused toner particles. This process can lead to poorly dispersed pigment throughout the toner and thus lead to lower density on the image page.

Microencapsulation techniques for dyeing of latex particles are known. One such technique is the emulsification/solvent evaporation method, in which styrene/butyl acrylate monomers are emulsified to create latex particles which are simultaneously impregnated with dye. This method limits control over the particle size and dispersion of the dye. Another known technique incorporates dye into preformed toner particles using a dichloromethane dye solution to plasticize the latex particles and facilitate dye transport, as illustrated in U.S. Pat. No. 4,613,559, the disclosure of which is hereby incorporated by reference in its entirety. In this technique, the particle size and shape are unchanged after dye incorporation; however, harmful organic solvents are used.

Improved methods for producing color toner, which increases the color gamut of an EA toner, improves color dispersion, and is less environmentally harmful, remain desirable.

SUMMARY

A process is provided which includes polymerizing at least one monomer resin to form latex particles; dispersing the latex particles in de-ionized water to form a latex dispersion; contacting the latex dispersion with at least one dye and surfactant; adding a supercritical fluid and water to the latex dispersion to form a latex dye mixture; removing the supercritical fluid from the latex dye mixture; washing excess un-reacted colorant from the latex dye mixture; and recovering a resin with the colorant encapsulated therein.

A process is provided including the steps of polymerizing at least one monomer resin to form latex particles; dispersing the latex particles in deionized water to form a latex dispersion; contacting the latex dispersion with at least one dye and surfactant; microencapsulating the at least one colorant into the latex dispersion by adding a supercritical fluid to the latex dispersion to form a latex dye mixture; removing the supercritical fluid from the latex dye mixture; washing excess un-reacted colorant from the latex dye mixture; recovering a resin with the colorant encapsulated therein; re-dispersing the resin with encapsulated colorant in deionized water to form a resin/colorant dispersion; aggregating the resin/colorant dispersion with optional additives to form aggregated particles; coalescing the aggregated particles to form toner particles; and recovering the toner particles.

A toner is provided which includes at least one monomer resin, at least one colorant microencapsulated into the resin; and one or more optional toner additives.

DETAILED DESCRIPTION

The present disclosure provides toners and processes for the preparation of toner particles having improved color dispersion and increased color gamut. Color toners of the present disclosure may be prepared under conditions which optimize color homogeneity while decreasing the amount of colorant needed to obtain a desired color.

In embodiments, toners of the present disclosure may be prepared by combining a latex polymer, a colorant, such as for example, a dye, a surfactant, and other optional additives. While the latex polymer may be prepared by any method within the purview of those skilled in the art, in embodiments the latex polymer may be prepared by emulsion polymerization methods, including semi-continuous emulsion polymerization, and the toner may include emulsion aggregation toners. Emulsion aggregation involves aggregation of both submicron latex and dye particles into toner size particles, where the particle size is, for example, in embodiments from about 0.1 microns to about 15 microns.

In embodiments, the colorant may be incorporated into the latex polymer via a microencapsulation technique where an emulsion of supercritical $CO_2$ and water, or a similar supercritical fluid, are added to the latex.

A supercritical fluid ("SCF") is a dense gas that is maintained above its critical pressure and above its critical temperature (the temperature above which it cannot be liquefied by any amount of pressure). Though supercritical fluids have gas-like properties, such as high compressibility and low viscosity, they exhibit many of the properties of liquids, such as high density and high solvating power. A near-supercritical fluid is a fluid that is not technically supercritical, but displays many of the properties of a supercritical fluid, such as high solvating power and compressibility. The use of the term "supercritical fluid" is intended to encompass near-supercritical fluids. Even substances that are normally solids or liquids at room temperatures can be brought to a supercritical fluid state by the application of appropriate temperature and pressure. A detailed discussion of supercritical fluids and their properties can be found in U.S. Pat. No. 4,482,731, the disclosure of which is hereby incorporated by reference in its entirety.

As used herein the term "supercritical" should be considered to encompass near-supercritical fluids, highly compressed fluids that are below their critical temperature point, yet exhibit many of the same qualities of true supercritical fluids, such as high solvating power and compressibility. Likewise a "supercritical state" should be considered to encompass a near-supercritical state. Supercritical fluids can be combinations of substances, such as $CO_2$ and water with an organic solvent, such as for example, methane, ethane, propane, ethylene, propylene, methanol, ethanol, acetone, combinations thereof and the like.

As used herein the term "dyes" may generally be described as a colored substance with a wide color gamut that has an affinity to the substrate to which it is being applied. Dyes may be applied in an aqueous solution, and may require a mordant to improve the fastness of the dye on the fiber. Dyes appear to be colored because they absorb some wavelengths of light preferentially. In contrast with a dye, a pigment generally is insoluble, and has no affinity for the substrate.

Resin

Any monomer suitable for preparing a latex for use in a toner may be utilized. As noted above, in embodiments the toner may be produced by emulsion aggregation. Suitable monomers useful in forming a latex polymer emulsion, and thus the resulting latex particles in the latex emulsion, include, but are not limited to, styrenes, acrylates such as methacrylates, butylacrylates, β-carboxyethyl acrylate (β-CEA), ethylhexyl acrylate, octylacrylate, etc., butadiene, isoprene, acrylic acid, methacrylic acid, itaconic acid, acrylonitriles, combinations thereof, and the like.

In embodiments, the latex polymer may include at least one polymer. In embodiments, at least one may be from about one to about twenty and, in embodiments, from about three to about ten. Exemplary polymers may include styrene acrylates, styrene butadienes, styrene methacrylates, and more specifically, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly (styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly (styrene-butadiene), poly(styrene-isoprene), poly(styrene-butyl methacrylate), poly(styrene-butyl acrylate-acrylic acid), poly(styrene-butyl methacrylate-acrylic acid), poly (butyl methacrylate-butyl acrylate), poly(butyl methacrylate-acrylic acid), poly(acrylonitrile-butyl acrylate-acrylic acid), and combinations thereof. The polymers may be block, random, or alternating copolymers.

In addition, polyester resins may be used as resins. Such polyesters include those obtained from the reaction products of bisphenol A and propylene oxide or propylene carbonate, as well as the polyesters obtained by reacting those reaction products with fumaric acid (as disclosed in U.S. Pat. No. 5,227,460, the entire disclosure of which is incorporated herein by reference), and branched polyester resins resulting from the reaction of dimethylterephthalate with 1,3-butanediol, 1,2-propanediol, and pentaerythritol.

In embodiments, a poly(styrene-butyl acrylate) may be utilized as the latex polymer, optionally in combination with beta-carboxyethyl acrylate. In embodiments, the styrene acrylate copolymer latex resin may have a glass transition temperature (Tg) of from about 50° C. to about 60° C., in embodiments from about 54° C. to about 57° C. The Tg can be measured using differential scanning calorimetry (DSC). In addition, the weight average molecular weight (Mw) of the resin may be from about 30 to about 100 kpse, in embodiments from about 55 to about 85 kpse, in other embodiments from about 57 to about 80 kpse. In embodiments, the resin may have a number average molecular weight (Mn) of from about 10 to about 30, in embodiments from about 12 to about 22 kpse. The Mw and Mn can be measured using gel permeation chromatography (GPC).

Surfactants

In embodiments, the latex may be prepared in an aqueous phase containing a surfactant or co-surfactant. Surfactants which may be utilized with the polymer to form a latex dispersion can be ionic or nonionic surfactants in an amount to provide a dispersion having the resin in an amount of from about 1 to about 60 weight percent solids, in embodiments of from about 3 to about 30 weight percent solids. The latex dispersion thus formed may be then charged into a reactor for aggregation and the formation of toner particles.

Where utilized, a resin dispersion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a highly concentrated solution with a concentration of from about 10% to about 100% (pure surfactant) by weight, in embodiments, from about 15% to about 75% by weight. In embodiments, the surfactant may be utilized so that it is present in an amount of from about 0.01% to about 20% by weight of the resin, in embodiments, from about 0.1% to about 10% by weight of the resin, in other embodiments, from about 1% to about 8% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants include, but are not limited to, alcohols, acids and ethers, for example, block copolymers based on ethylene oxide and propylene oxide such as PLURONIC® available from BASF Chemicals AP, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing nonionic surfactants may be utilized in embodiments.

Colorants

In embodiments, the process of the present disclosure may include adding a colorant, optionally in a dispersion, through the process of microencapsulation in which a supercritical fluid is used to facilitate the transport of colorants such as dyes into the latex particles. By incorporating the colorant into the latex particles prior to the aggregation and coalescence process, one may obtain toners with more evenly distributed color, increasing the color gamut, and reducing or eliminating solvent use. The colorant particles may be dispersed in an aqueous water phase.

Colorants useful in forming toners in accordance with the present disclosure include dyes, mixtures of dyes, and the like. Use of dyes instead of pigments may lower costs and reduce or eliminate use of pigments. (The use of pigments can lead to poorly dispersed pigment throughout the toner and thus lead to lower density on the image page.) Pigment inks generally do not have the brightness and broad color range (or gamut) that dye inks have. Although pigment based prints have a higher longevity than dye-based prints, dye-based prints have more than adequate longevity, i.e., lasting for up to about 100 years kept under glass and away from direct light. Another advantage of utilizing dye inks over pigments is due to the metameric failure of pigments, which is the human eye detecting a shift in color when viewing a print under different light sources.

The colorant may be present in the toner of the disclosure in an amount of from about 0.2 to about 15 percent by weight of toner, in embodiments in an amount of from about 1 to about 6 percent by weight of the toner.

Suitable colorants may include Sudan Red 7B, Solvent yellow 1, Acid Red 94, Solvent Violet 8, combinations thereof and the like. Three of these dyes are illustrated below.

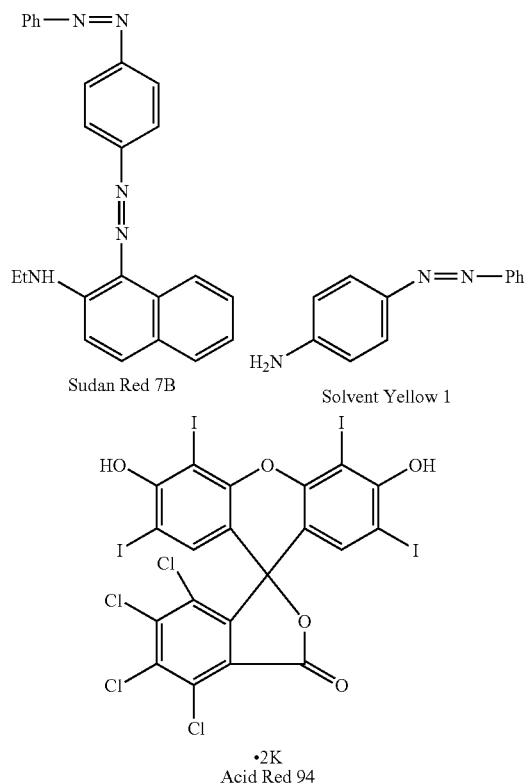

Sudan Red 7B

Solvent Yellow 1

Acid Red 94

Other examples of suitable dye components include azo, xanthene, methine, polymethine, acridine, arylmethane, and anthraquinone dyes. Illustrative examples of azo dyes include alizarine yellow R, allura red AC, amaranth, amido black 10B, aniline yellow, azo compound, azorubine, biebrich scarlet, bismarck brown Y, black 7984, brilliant black BN, brown FK, brown HT, chrysoine resorcinol, citrus red 2, congo red, D&C red 33, eriochrome black T, fast yellow AB, hydroxynaphthol blue, janus green B, lithol rubine BK, methyl orange, methyl red, methyl yellow, oil red O, oil yellow DE, orange B, orange G, orange GGN, para red, ponceau 2R, ponceau 4R, ponceau 6R, ponceau S, prontosil, red 2G, red no. 40, scarlet GN, solvent red 164, solvent red 26, solvent yellow 124, sudan black B, sudan I, sudan II, sudan III, sudan IV, sudan red G, sudan yellow 3G, sunset yellow FCF, tartrazine, trypan blue, yellow 2G, solvent yellow 2, solvent yellow 58, solvent red 19, solvent red 27, disperse yellow 60, disperse orange 5, disperse orange 30, disperse orange 138, disperse orange 1, disperse red 1, disperse red 13, disperse red 41, disperse red 58, disperse red 72, disperse red 73, disperse red 90, disperse red 156, disperse red 210, disperse black 4, disperse black 7, disperse blue 183, disperse blue 165, dispersol fast red R, SRA brilliant blue 4, Cl 26050, copper tetra(octadecyl sulfonamido) phthalocyanine, anthrathrene blue identified in the Color Index as Cl 69810, special blue X-2137, diarylide yellow 3,3-dichlorobenzidene acetoacetanilides, solvent yellow 16, a nitrophenyl amine sulfonamide identified in the Color Index as foron yellow SE/GLN, dispersed yellow 33, 2,5-dimethoxy-4-sulfonanilide phenylazo-4'-chloro-2,5-dimethoxy acetoacetanilide, yellow 180 and permanent yellow FGL, combinations thereof, and the like. Illustrative examples of xanthene dyes include fluorene dyes, such as for example, pyronin dyes; fluorone dyes, such as, fluorone, calcein, carboxyfluorescein, eosin, erythrosine, fluorescein, fluorescein amidite, fluorescein isothiocyanate, indian yellow, merbromin, basic red 1, basic red 8, solvent red 45, and the like. Examples of methine and polymethine dyes include disperse yellow 31, disperse yellow 61, disperse yellow 99, basic violet 7, basic violet 16, combinations thereof, and the like. Suitable examples of acridine dyes include acridine orange, acridine yellow, combinations thereof, and the like. Specific examples of arylmethane dyes include diarylmethane dyes, such as for example, auramine O, and triarylmethane dyes, such as, triphenylmethane, aluminon, aniline blue WS, aurin, brilliant blue FCF, brilliant green, bromocresol green, bromocresol purple, bromophenol blue, bromothymol blue, bromsulphthalein, chlorophenol red, coomassie, cresol red, crystal violet lactone, ethyl green, fast green FCF, fluoran, fuchsine, fuchsine acid, green S, light green SF yellowish, malachite green, methyl blue, methyl violet, methylrosaniline, new fuchsine, pararosaniline, patent blue V, phenol red, phenolphthalein, phenolsulfonphthalein, rose bengal, thymolphthalein, victoria blue BO, water blue, xylene cyanol, combinations thereof, and the like. Specific examples of anthraquinone dyes are alizarin, anthrapurpurin, carminic acid, indanthrene blue RS, morindone, oil blue 35, oil blue A, purpurin, quinizarine green SS, vat yellow 4, solvent red 52, solvent violet 13, solvent blue 36, solvent blue 69, solvent green 3, disperse red 15, disperse red 11, disperse red 9, disperse red 4, disperse violet 6, disperse blue 3, disperse blue 6, disperse blue 23, disperse blue 28, disperse blue 34, disperse blue 60, disperse blue 73, reactive blue 6, Cl 60710, combinations thereof, and other similar types.

Other suitable examples of dyes include cyanine dyes, such as derivates of phthalocyanine; diazonium dyes, based on diazonium salts; nitro dyes, based on a —$NO_2$ nitro functional group; nitroso dyes, based on a —N═O nitroso functional group; phthalocyanine dyes, derivates of phthalocyanine; quinone-imine dyes, such as azin dyes, such as for example, eurhodin dyes, such as for example, neutral red; safranin dyes such as for example safranin, mauveine, perkin's mauve, phenazine, indamins; indophenol dyes, such as for example, dichlorophenolindophenol and indophenol; oxazin dyes, such as for example, nile red and nile blue; oxazone dyes; thiazin dyes, such as for example, methylene blue, new methylene blue, tolonium chloride; thiazole dyes, such as, primuline, thioflavin; rhodamine dyes, such as rhodamine, rhodamine 6G, rhodamine B, rhodamine 123, sulforhodamine 101, sulforhodamine B, and texas red, and combinations thereof.

Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, and combinations thereof.

In embodiments, other colorant examples include known dyes such as food dyes, yellow, blue, green, red, and magenta dyes, and the like, and combinations thereof.

Supercritical Fluid

As discussed above, in embodiments a supercritical fluid, for example $CO_2$ optionally with water, may be used to incorporate the colorant into the latex dispersion via microencapsulation.

Suitable supercritical fluids include, but are not limited to, $CO_2$ optionally with water, methane, ethane, propane, ethylene, propylene, methanol, ethanol, acetone, and combinations thereof, and the like.

In embodiments, supercritical $CO_2$ may be added in amounts of from about 1% to about 80%, in embodiments, from about 30% to about 60%. In embodiments, supercritical $CO_2$ may be supplied in ratios of about 20 grams $CO_2$ per gram polymer latex to about 80 grams $CO_2$ per gram polymer latex, in embodiments, from about 33 grams $CO_2$ per gram polymer latex to about 56 grams $CO_2$ per gram polymer latex.

Microencapsulation

As noted above, the present process includes forming a toner using a standard emulsion aggregation process. In embodiments, the process includes forming a latex via an emulsion or polymerization dispersion, as disclosed, for example, in U.S. Pat. No. 6,120,967, the disclosure of which is hereby incorporated by reference in its entirety. In embodiments, the process includes polymerizing at least one resin to form a latex with particles of from about 100 nm to about 200 nm in size. More than one resin may be utilized. As noted above, the resin utilized may include styrenes, acrylates, methacrylates, butadienes, isoprenes, acrylic acids, methacrylic acids, acrylonitriles, combinations thereof, and the like. In embodiments, a styrene/butyl acrylate polymer may be utilized.

In embodiments, the latex particles may be dispersed in de-ionized water to form a latex dispersion using an ultrasonic bath. In embodiments, at least one colorant and surfactant may be incorporated into the latex dispersion. In embodiments, the colorant and surfactant may be added to the latex dispersion in any suitable apparatus which permits intimate mixture of the polymer and colorant, the introduction of the supercritical fluid at a pressure sufficient to maintain its supercritical state, release of pressure from the system, expansion of the preparation and separation of the supercritical fluid. In embodiments, a suitable container may include a sealed container such as a variable volume cell or a reactor including for example, the Buchi Limbo, a 1-2 liter high pressure/temperature reactor with operating conditions 350C/350 Bar, commercially available from Buchiglasuster.

A supercritical fluid may then be added to the container, after which the container may be pressurized and a magnetic stirrer may be used to emulsify the supercritical fluid and water.

While the temperature and pressure applied to the container may vary depending on the supercritical fluid, in embodiments, at a temperature of from about 15° C. to about 60° C., in embodiments from about 25° C to about 45° C., and a pressure maintained from about 50 bar to about 350 bar, in embodiments, from about 100 bar to about 200 bar, to maintain the supercritical state of the fluid. After incorporating of the dye into the latex is complete, pressure is released rapidly, permitting the latex to expand and the supercritical fluid to evaporate, forming microcapsules of colorant in the latex material. In embodiments, batch processing time is from about 2 hours to about 40 hours, in embodiments, from about 5 hours to about 24 hours.

The polymer resins utilized to form the latex may swell when in contact with the supercritical fluid. Swelling is a process whereby the supercritical fluid dissolves in or permeates the polymer, leading to a depression of the polymer's melting point. This depression of the polymer's melting point allows it to become fluid without dissolving at sub-melting point temperatures. The polymers may thus be soluble in supercritical fluids which are relatively inert and nontoxic, such as carbon dioxide.

In embodiments, the present disclosure may include microencapsulation of at least one colorant into the latex. In embodiments, a supercritical fluid, such as for example, supercritical $CO_2$, although other supercritical fluids such as supercritical $N_2O$ also are suitable, may be used to swell or liquefy the latex polymeric substance at temperatures significantly below the glass transition point of the polymer. The $CO_2$ may also be supplied in a non-supercritical state, and then brought to a supercritical state. This embodiment may also operate with $CO_2$ at near-supercritical conditions.

In embodiments, the intimate mixing under pressure of the polymer material with the at least one colorant, either before or after the supercritical fluid is added to the polymer latex, followed by an abrupt release of pressure, leads to efficient plasticizing or solidification of the latex around the colorant. The above method may thus be useful for microencapsulating the colorant that would otherwise be adversely affected by the temperatures required to melt polymeric shell materials under normal atmospheric conditions, or that would be adversely affected by the presence of the organic solvents typically used to dissolve the latex in traditional microencapsulation methods.

In embodiments, the latex and colorant may be thoroughly mixed while the latex is in a solid particulate form prior to the introduction of a supercritical fluid into the system. The latex colorant mixture may be further mixed after introduction of the supercritical fluid to achieve an intimate mixture of latex and colorant. In embodiments, the mixture may be stirred for about 1 s/hours, to about 40 hours, in embodiments, from about 5 hours, to about 24 hours, at a speed of from about 30 revolutions per minute (rpm) to about 200 rpm, in embodiments from about 80 rpm to about 160 rpm. Heat may be added to or removed from the system at any time to aid in microencapsulation. Suitable temperatures may be from about 15° C. to about 80° C., in embodiments from about 20° C. to about 60° C.

After microencapsulation, where the dye is incorporated into the latex, excess gas may be vented off slowly to minimize foaming. To remove any excess unreacted dye, the latex dye mixture may be washed with absolute ethanol until the wash solution is colorless. These dyed latex particles may then be re-dispersed in deionized water and added to a reactor, such as a 2 liter glass bottom reactor, commercially available from Chemglass Life Sciences, to prepare the toner particles.

Microencapsulation using the methods of the present disclosure can be achieved at latex-to-colorant ratios of for example, from about 1:1 to about 1:3, in embodiments, from about 1:1 to about 1:2.

In accordance with the present disclosure, it has been found that the processes herein may produce latex particles that retain the same molecular weight properties of the starting resin, including equivalent charging and fusing performance.
Toner The latex thus formed as described above may be utilized to form toner compositions by any method within the purview of those skilled in the art. The latex emulsion may be contacted with other additives to form a toner by a suitable process, in embodiments, an emulsion aggregation and coalescence process.

In embodiments, the optional additional ingredients of a toner composition including wax, and other additives may be added after incorporating the dye into the latex. The additional ingredients may be added after the formation of the latex emulsion.
Wax Optionally, a wax may also be combined with the resin possessing the colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, the present disclosure provides processes for producing toner particles with an increased color gamut by incorporating colorant into the latex via microencapsulation utilizing a supercritical fluid, in embodiments, $CO_2$ and water. In embodiments, a process of the present disclosure includes polymerizing at least one resin to form latex particles; dispersing the latex particles in de-ionized water to form a latex dispersion; contacting the latex dispersion with at least one colorant and surfactant; adding a supercritical fluid and water to the latex dispersion to form a latex dye mixture; removing the supercritical fluid from the latex dye mixture; and washing excess un-reacted colorant from the latex dye mixture.

In embodiments, the process may include re-dispersing the latex dye mixture in deionized water; aggregating the latex with the encapsulated colorant to form aggregated particles; coalescing the aggregated particles to form toner particles; and recovering the toner particles.

Once all the components are combined, the pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

The resulting toner particles may have a volume average diameter of, for example, from about 2 μm to about 25 μm, in embodiments from about 3 μm to about 15 μm, in other embodiments from about 4 μm to about 10 μm.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and the like, and mixtures thereof.

Other suitable aggregating agents also include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in other embodiments from about 0.5% to about 5% by weight, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

Shell Resin

In embodiments, after aggregation, but prior to coalescence, a resin coating may be applied to the aggregated particles to form a shell thereover. Any resin described above as suitable for forming the core resin may be utilized as the shell. Any latex utilized noted above to form the core latex may be utilized to form the shell latex. In embodiments, a styrene-n-butyl acrylate copolymer may be utilized to form the shell latex.

Multiple resins may be utilized in any suitable amounts. In embodiments, a first resin, for example an acrylate resin, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art, including dipping, spraying, and the like. In embodiments, the resins utilized to form the shell may be in an emulsion including any surfactant described above. The emulsion possessing the resins may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

The shell latex may be applied until the desired final size of the toner particles is achieved, in embodiments from about 3 microns to about 12 microns, in other embodiments from about 4 microns to about 8 microns. In other embodiments, the toner particles may be prepared by in-situ seeded semi-continuous emulsion copolymerization of the latex with the addition of the shell latex once aggregated particles have formed.

Coalescence

Following aggregation to the desired particle size and application of any optional shell, the particles may then be coalesced to the desired final shape, the coalescence being achieved by, for example, heating the mixture to a temperature of from about 45° C. to about 100° C., in embodiments from about 55° C. to about 99° C., which may be at or above the glass transition temperature of the resins utilized to form the toner particles, and/or reducing the stirring, for example to from about 100 rpm to about 1,000 rpm, in embodiments from about 200 rpm to about 800 rpm. Higher or lower temperatures may be used, it being understood that the temperature is a function of the resins used for the binder. Coalescence may be accomplished over a period of from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; ammonium methyl sulfate; zinc salts of di-t-butyl salicyclic acid such as BONTRON E84™ and aluminum salts of di-t-butyl salicyclic acid such as BONTRON E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000 and 6,214,507, the disclosures of each of which are hereby incorporated by reference in their entirety.

The following prophetic Example is being submitted to illustrate embodiments of the present disclosure. This Example is intended to be illustrative only and is not intended to limit the scope of the present disclosure.

EXAMPLES

Example 1

A process of microencapsulation using a $CO_2$/water emulsification is described hereinbelow. About 4 wt % of a dye such as, for example, Acid Red 94, is incorporated into about 75 wt % of a latex, such as, for example, a styrenelbutylacrylate formed by either emulsion or dispersion polymerization.

First, styrene/butyl acrylate monomers are polymerized via emulsion polymerization to form about 100 nm to about 200 nm particles. These particles are then placed on a freeze drier for about 48 hours. The latex particles are dispersed in de-ionized (DI) water using an ultrasonic bath. This solution is then transferred to a variable volume cell where the desired dye and about 1 wt % of a surfactant, such as, for example, polyethylene oxide/polypropylene oxide block copolymer (PLURONIC F108), are added to the latex dispersion. The cell is sealed and about 350 grams of supercritical $CO_2$ is added. Once the supercritical $CO_2$ is added, the cell is pressurized and a magnetic stirrer is used to emulsify the supercritical $CO_2$ and water. The mixture is allowed to stir for approximately 10 hours. After the dye is incorporated into the latex, i.e. after about 12 hours, the $CO_2$ is vented off slowly to minimize foaming. To remove any excess unreacted dye, the latex dye mixture is washed with absolute ethanol until the wash solution is colorless. These dyed latex particles are then re-dispersed in DI water and added to a reactor, such as a 4 liter glass bottom reactor, commercially available from Chemglass Life Sciences. Additionally, a wax may be added to the latex dye mixture. The mixture is then homogenized at high shear with a coagulating agent, such as for example, a polyaluminum chloride for about 20 minutes. The mixture is then aggregated for a predetermined time period until the particle size is sufficient for latex shell addition (such as from about 3.0 to about 7.0 μm).

A latex shell is added until stabilization has been reached, and then the particle is grown further until the optimum particle size is reached. The aggregation is then stopped by the addition of a base, such as for example, sodium hydroxide or ammonium hydroxide. After about 20 minutes, the batch is heated to the coalescing temperature of from about 85° C. to about 100° C. and kept at that elevated temperature for a period of from about 1 hour to about 8 hours depending upon the desired shape. The particle batch is then cooled to a lower temperature of about 60° C., and the pH is adjusted with a base to about 8. The particle batch is then sieved and washed several times with DI water, then washed with an acid adjusted rinse before a final rinse with DI water. The batch is dried and blended with a select set of additives for machine testing.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
   polymerizing at least one monomer resin to form latex particles;
   dispersing the latex particles in de-ionized water to form a latex dispersion;
   contacting the latex dispersion with at least one dye and surfactant;
   adding a supercritical fluid and water to the latex dispersion to form a latex dye mixture;
   removing the supercritical fluid from the latex dye mixture;
   washing excess un-reacted colorant from the latex dye mixture; and
   recovering a resin with the colorant encapsulated therein.

2. The process of claim 1, wherein the monomer is selected from the group consisting of styrenes, acrylates, methacrylates, butadienes, isoprenes, acrylic acids, methacrylic acids, acrylonitriles, and combinations thereof.

3. The process of claim 1, wherein the resin is selected from the group consisting of poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate isoprene), poly(methyl acrylate-isoprene), poly(ethyl acrylate-isoprene), poly(propyl acrylate-isoprene), poly(butyl acrylate-isoprene), poly(styrene-butyl acrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and combinations thereof.

4. The process of claim 1, wherein the at least one dye is present in an amount of from about 0.2% to about 15% by weight of the resin.

5. The process of claim 1, wherein the supercritical fluid includes carbon dioxide and water with an organic solvent selected from the group consisting of methane, ethane, propane, ethylene, propylene, methanol, ethanol, acetone and combinations thereof.

6. The process of claim 1, further comprising:
   re-dispersing the resin with encapsulated colorant in deionized water to form a resin/colorant dispersion;
   aggregating the resin/colorant dispersion with optional additives to form aggregated particles;
   coalescing the aggregated particles to form toner particles; and
   recovering the toner particles.

7. The process of claim 1, wherein the process occurs in a container selected from the group consisting of sealed variable volume cells, high pressure reactors, temperature metal reactors, and combinations thereof.

8. A process comprising:
   polymerizing at least one monomer resin to form latex particles;
   dispersing the latex particles in deionized water to form a latex dispersion;
   contacting the latex dispersion with at least one dye and surfactant;
   microencapsulating the at least one colorant into the latex dispersion by adding a supercritical fluid to the latex dispersion to form a latex dye mixture;
   removing the supercritical fluid from the latex dye mixture;
   washing excess un-reacted colorant from the latex dye mixture;
   recovering a resin with the colorant encapsulated therein;
   re-dispersing the resin with encapsulated colorant in deionized water to form a resin/colorant dispersion;
   aggregating the resin/colorant dispersion with optional additives to form aggregated particles;
   coalescing the aggregated particles to form toner particles; and
   recovering the toner particles.

9. The process of claim 8, wherein the monomer is selected from the group consisting of styrenes, acrylates, methacrylates, butadienes, isoprenes, acrylic acids, methacrylic acids, acrylonitriles, and combinations thereof.

10. The process of claim 8, wherein the resin is selected from the group consisting of poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate isoprene), poly(methyl acrylate-isoprene), poly(ethyl acrylate-isoprene), poly(propyl acrylate-isoprene), poly(butyl acrylate-isoprene), poly(styrene-butyl acrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and combinations thereof.

11. The process of claim 8, wherein the at least one dye is present in an amount of from about 1% to about 6%.

12. The process of claim 8, wherein microencapsulation occurs in a container selected from the group consisting of sealed variable volume cells, high pressure reactors, temperature metal reactors, and combinations thereof.

13. The process of claim 8, wherein the toner particles possess a size of from about 1 micron to about 10 microns.

14. The process of claim 8, wherein the supercritical fluid includes carbon dioxide and water with an organic solvent selected from the group consisting of methane, ethane, propane, ethylene, propylene, methanol, ethanol, acetone, and combinations thereof.

* * * * *